(12) United States Patent
Pierfelice (10) Patent No.: US 9,751,454 B2
(45) Date of Patent: Sep. 5, 2017

(54) CONTROL OF VEHICLE EXTERIOR LIGHTS BASED ON VEHICLE LOCATION AND/OR PLANNED ROUTE INFORMATION

(71) Applicant: Toyota Motor Engineering & Manufacturing North America, Inc., Erlanger, KY (US)

(72) Inventor: Jeffrey E. Pierfelice, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/010,082

(22) Filed: Jan. 29, 2016

(65) Prior Publication Data
US 2017/0217360 A1    Aug. 3, 2017

(51) Int. Cl.
| | | |
|---|---|---|
| B60Q 1/08 | (2006.01) | |
| B60Q 1/14 | (2006.01) | |
| B60Q 1/00 | (2006.01) | |
| B60Q 1/34 | (2006.01) | |

(52) U.S. Cl.
CPC ......... B60Q 1/1423 (2013.01); B60Q 1/0023 (2013.01); B60Q 1/08 (2013.01); B60Q 1/085 (2013.01); B60Q 1/346 (2013.01); B60Q 2300/056 (2013.01); B60Q 2300/30 (2013.01); B60Q 2300/42 (2013.01)

(58) Field of Classification Search
CPC ...... B60Q 2300/42; B60Q 1/085; B60Q 1/08; B60Q 2300/314; B60Q 2300/32; B60Q 2300/337; B60Q 1/0023; B60Q 1/04; B60Q 1/14; B60Q 1/1423; B60Q 1/28; B60Q 1/346; B60Q 2300/312; B60Q 2300/324; B60Q 2300/3321; B60Q 2300/43; B60Q 2400/30; H05B 37/0218
See application file for complete search history.

(56) References Cited

U.S. PATENT DOCUMENTS

| | | | |
|---|---|---|---|
| 6,023,221 A | 2/2000 | Michelotti | |
| 7,397,349 B2 | 7/2008 | Lahr et al. | |
| 8,287,163 B2 * | 10/2012 | Watanabe | B60Q 1/085 362/466 |
| 8,519,625 B2 * | 8/2013 | Nakano | B60Q 1/1423 315/77 |
| 8,786,697 B2 * | 7/2014 | Kawasaki | G06K 9/00805 340/425.5 |
| 2005/0007246 A1 | 1/2005 | Yen et al. | |
| 2005/0187710 A1 | 8/2005 | Walker | |

(Continued)

FOREIGN PATENT DOCUMENTS

| | | |
|---|---|---|
| DE | 10238377 A1 | 4/2004 |
| DE | 10355807 A1 | 7/2004 |

(Continued)

*Primary Examiner* — Vibol Tan
(74) *Attorney, Agent, or Firm* — Christopher G. Darrow; Darrow Mustafa PC (57) ABSTRACT

A computing device for a vehicle exterior light control system is described. The computing device includes one or more processors for controlling operation of the computing device, and a memory for storing data and program instructions usable by the one or more processors. The one or more processors are configured to execute instructions stored in the memory to automatically operate vehicle headlights responsive to a location of the vehicle.

12 Claims, 7 Drawing Sheets

(56) References Cited

U.S. PATENT DOCUMENTS

| | | | |
|---|---|---|---|
| 2008/0082259 A1 | 4/2008 | Landschaft et al. | |
| 2010/0033984 A1* | 2/2010 | Sugimoto | B60Q 1/143 |
| | | | 362/538 |
| 2012/0072080 A1* | 3/2012 | Jeromin | G06K 9/00798 |
| | | | 701/49 |
| 2015/0077225 A1* | 3/2015 | Proefke | G07C 9/00182 |
| | | | 340/5.72 |
| 2015/0360601 A1* | 12/2015 | Chambers | B60Q 1/143 |
| | | | 701/49 |
| 2016/0001695 A1* | 1/2016 | Fennelly | B60W 40/11 |
| | | | 701/49 |

FOREIGN PATENT DOCUMENTS

| | | | |
|---|---|---|---|
| JP | 60240545 A | * | 11/1985 |
| JP | S60240545 A | | 11/1985 |
| JP | H08295174 A | | 11/1996 |
| JP | H10141963 A | | 5/1998 |

\* cited by examiner

CONTROL OF VEHICLE EXTERIOR LIGHTS BASED ON VEHICLE LOCATION AND/OR PLANNED ROUTE INFORMATION

TECHNICAL FIELD

Aspects of the disclosure generally relate to systems and methods for controlling vehicle exterior lights, such as headlights, tail lights and hazard lights.

BACKGROUND

Drivers in conventional vehicles and occupants of autonomously-driven vehicles may neglect to operate various vehicle exterior lights in situations where the lights should be operated. For example, a driver pulling off to the side of a road may forget to actuate the vehicle hazard lights prior to or during exiting the driving lane. In addition, users may not always be aware of conditions where operation of the exterior lights would increase vehicle visibility and reduce accident risks. Thus, it would be beneficial to have a system and method for automatically controlling operation of vehicle exterior lights in situations where such operation would enhance safety.

SUMMARY OF THE INVENTION

In one aspect of the embodiments described herein, a computing device for a vehicle exterior light control system is provided. The computing device includes one or more processors for controlling operation of the computing device, and a memory for storing data and program instructions usable by the one or more processors. The one or more processors are configured to execute instructions stored in the memory to automatically operate vehicle headlights responsive to a location of the vehicle.

In another aspect of the embodiments described herein, a method of controlling a vehicle is provided. The method includes the step of automatically operating exterior lights of the vehicle responsive to a presence of the vehicle in an exterior light operating location.

DETAILED DESCRIPTION

The present disclosure describes embodiments of a location-based vehicle exterior light control system. The system is configured for automatically controlling vehicle exterior lights (such as headlights, hazard lights, tail lights, etc.) based on the presence of a vehicle at (or the approach of a vehicle toward) various locations designated as "light operating locations". For example, headlights and taillights may be operated automatically in locations such as parking garages and in certain terrain areas in which vehicle-to-vehicle visibility is relatively lower than on flatter roads. Hazard lights may be automatically operated whenever the vehicle is determined to have left a road boundary. The system is also configurable by a user to remind the user to manually turn the exterior lights on and off according to the presence of the vehicle in these locations, or the approach of the vehicle toward these locations.

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
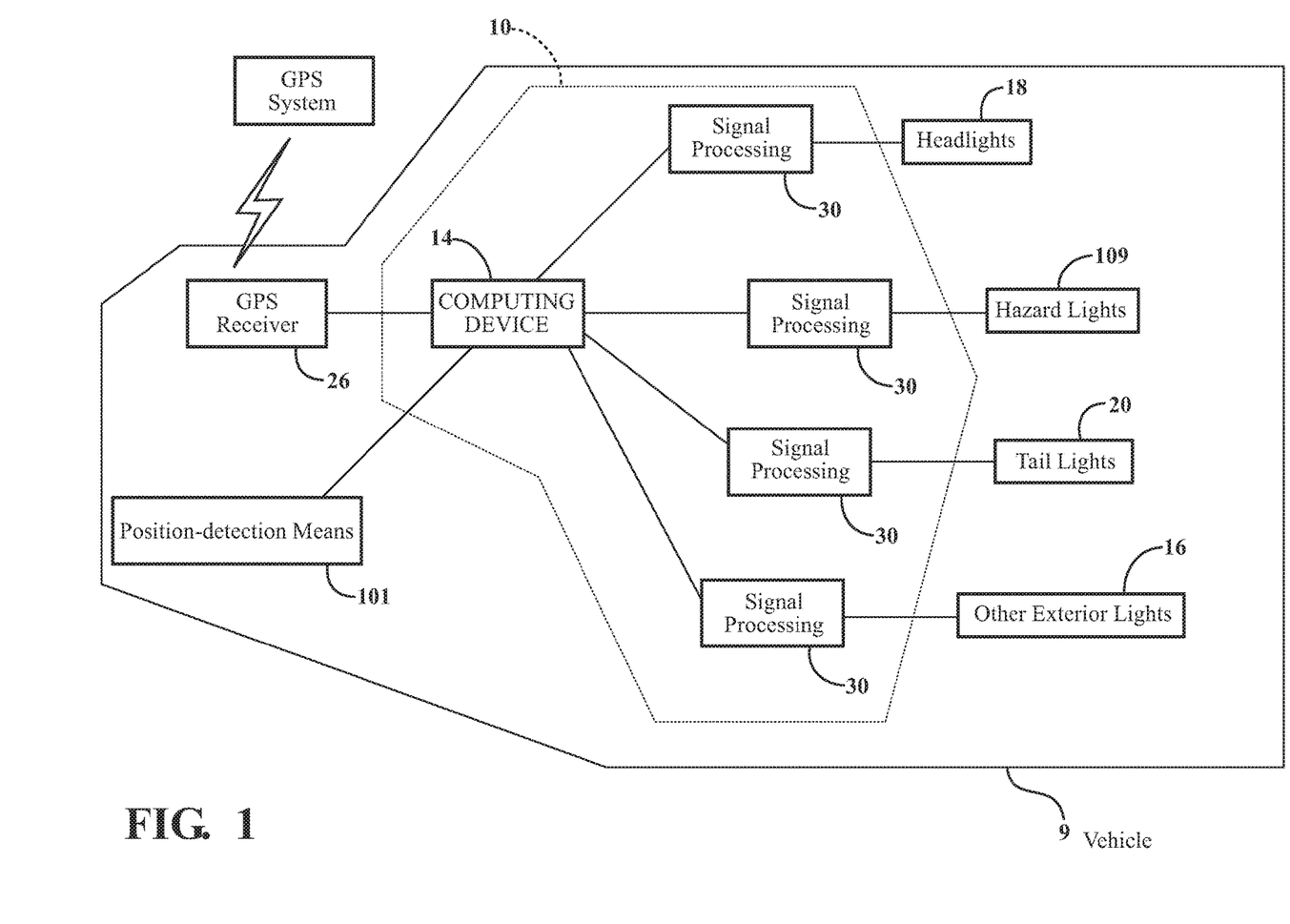
FIG. 1 is a block diagram of one embodiment of a location-based exterior light control system.

FIG. 1 shows a block diagram of one embodiment of a location-based vehicle exterior light control system 10. System 10 is configured for automatically controlling vehicle exterior lights (such as headlights, hazard lights, tail lights, etc.) based on the location of the vehicle and/or a planned route for the vehicle. The system 10 is also configurable by a user to remind the user to manually turn the exterior lights on and off according to the various criteria set forth herein. In the embodiment shown, system 10 includes an exterior lighting control computing device 14. In the event that control signals generated by the computing device require signal processing in order to operate the exterior lights in the manner desired, suitable signal processing means 30 may also be provided in system 10.

Figure 2:
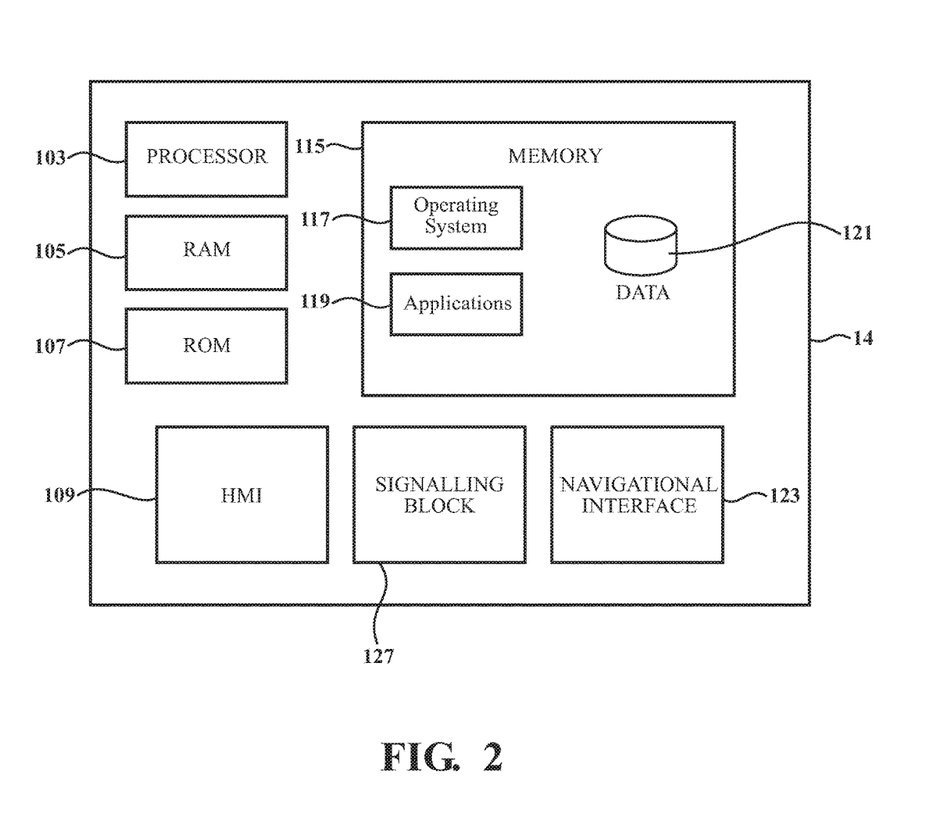
FIG. 2 is a block diagram of a computing device in a location-based exterior light control system according to one or more illustrative embodiments of the disclosure.

FIG. 2 illustrates a block diagram of a computing device 14 in a location-based vehicle exterior light control system according to one or more illustrative embodiments of the disclosure. The computing device 14 may have one or more processors 103 for controlling overall operation of the device 14 and its associated components, including RAM 105, ROM 107, input/output module or HMI (human machine interface) 109, memory 115 and any additional elements, such as navigational interface 123, control signaling block 127, and any other associated elements.

Input/Output (I/O) 109 may include a microphone, keypad, touch screen, and/or stylus through which a user of the computing device 14 may provide input, and may also include one or more of a speaker for providing audio output and a video display device for providing textual, audiovisual and/or graphical output. Software may be stored within memory 115 and/or other suitable storage to provide instructions to processor 103 for enabling device 14 to perform various functions. For example, memory 115 may store software used by the device 14, such as an operating system 117, application programs 119, and an associated internal database 121. Processor 103 and its associated components may enable the exterior light control system 10 to execute a series of computer-readable instructions directed to performing the various functions and operations described herein. Computing device 14 is also configured (for example, using a suitable navigational interface 123) for operative communication with a navigation system (for example, through a GPS device 26) for the purposes described herein. Computing device 14 is configured to receive current or updated vehicle location information (such as GPS coordinates) from the navigation system. For purposes of description herein, the vehicle location information will be discussed in terms of GPS coordinates provided by a GPS system. However, it will be understood that vehicle location information and other navigation information used for the purposes described herein may be in any suitable alternative form.

As used herein, the terms "light operating location" and "exterior light operating location" refer to a geographical location where it is deemed desirable to operate (i.e., to turn on and off as deemed desirable) one or more vehicle exterior lights. Also, the term "headlight operating location" refers to a geographical location where it is deemed desirable to operate the vehicle headlights. Also, the term "tail light operating location" refers to a geographical location where it is deemed desirable to operate the vehicle tail lights. The head lights and tail lights may be wired in the same electrical circuit and may be operated together. Thus, the system 10 may be configured to so that the headlights and taillights may be turned on and off together or simultaneously, using the same operating criteria. Alternatively, the system 10 may be configured so that the headlights and tail lights are operable autonomously and independently of each other, using either the same or different operating criteria. In addition, certain locations or coordinates may be flagged or designated as both a "headlight operating location" and a "tail light operating location", for example, in locations where maximum ego-vehicle visibility is desired from all directions from which the ego-vehicle may be viewed.

Also, the term "hazard light operating location" refers to a geographical location where it is deemed desirable to operate the vehicle hazard lights. The various exterior light operating locations described herein may or may be not be narrowly-defined point coordinates, and may consist of structures, stretches of a road or route, or specific areas defined by a certain radius or zone about specific coordinates or defined by a group or collection of coordinates.

In embodiments described herein, geographical locations or coordinates may be flagged or designated as a "light operating location" using any of a variety of methods. For example, a location or set of coordinates may be flagged or designated as a particular type of "light operating location" (i.e., headlights, hazards. etc.) in the navigation system or in the set of navigational maps residing on the receiver 26. The computing device 14 may be configured to recognize the "light operating location" designation and to operate the associated set of lights while the vehicle resides in the designated location.

In another example, a location or set of coordinates for a "light operating location" may be stored on computing device 14 for comparison with the current vehicle coordinates. When the current vehicle location matches a stored location designated as a "light operating location", the computing device operates the associated set of lights. This operational mode enables a user to designate new light operating locations and to delete currently saved light operating locations from the system. Other operational schemes are also contemplated.

Computing device 14 may also be configured to continuously compare the current vehicle GPS coordinates or location information with the GPS coordinates or location information of various light operating locations. Coordinates or location information relating to the light operating locations may be stored in memory 115 or in another location separate from computing device 14.

Computing device 14 may also be configured to continuously evaluate coordinates received from the navigation system for any "light operating location" flags or designations embedded therein or associated therewith, to turn on the associated exterior lights when the vehicle is in the light operating location or approaching the light operating location, and to turn off the lights when the vehicle is no longer in the light operating location. The computing system 14 may also be configured to operate the associated vehicle lights, either when the vehicle in the light operating location accordance with the received operating parameters.

Computing device 14 is also configured for generating lighting control signals designed to operate various exterior lights responsive to a current location and/or a planned route of the vehicle. In one embodiment, signal generation and transmission are performed by a signaling block 127 controlled by the processor and incorporated into the computing device. If signal processing means are needed, signal processing means 30 may be incorporated into the signaling block 127 or otherwise into the computing device 14, into the exterior lights themselves, or (as shown in FIG. 1) located along the signal path between the computing device 14 and the controlled exterior lights. Computing device 14 may also be configured for operating multiple exterior lights or types of lights simultaneously, according to the requirements of a particular situation.

In one embodiment, computing device 14 is configured for operative communication with the various exterior lights described herein, and incorporates all the hardware and software needed to generate and transmit the control signals necessary to effect control of the exterior lights. Alternatively, the hardware and/or software for such purposes as control signal generation, transmission and interfacing with the vehicle exterior lighting systems and/or components may be physically separate from and in communication with the computing device, and may be activated to generate and transmit the desired control signals responsive to a command signal provided by the computing device.

Computing device 14 may be operatively coupled to exterior lights 18, 109, 20 and to any other exterior lights (generally designated 16) using any suitable method (for example, wirelessly, through individual dedicated wired connections as shown in FIG. 1, or via a controller bus in a manner known in the art). In a particular embodiment, computing device 14 is incorporated into a lighting control module (not shown) configured for performing all the navigational interface, computing, and signal generation and transmission functions described herein.

Navigation system receiver 26 (for example, a GPS receiver or device) is in operative communication with computing device 14 and provides vehicle location information to the computing device. Device 26 may be a known GPS device configured for communication with a GPS satellite system. Device 26 may be embodied in a known GPS receiver separate from computing device 14 and configured for wired or wireless communication with computing device 14. In a manner known in the art, device 26 receives current coordinates of the vehicle. In an alternative embodiment, the navigation system interface or GPS device is incorporated into the computing device and is configured for operative communication with the other elements of the computing device.

In one operational mode, the exterior light control system 10 is configured to automatically operate the vehicle headlights responsive to the vehicle's detected presence in a headlight operating location. In one embodiment, the GPS coordinates or other location information relating to various headlight operating locations are saved on a navigation system map or in a memory. When it is determined by the computing device that the current vehicle coordinates place the vehicle in a headlight operating location, the computing device automatically activates the headlights. When the vehicle is no longer at the headlight operating location, the headlights may be automatically turned off.

In one example, the system 10 determines that the vehicle has entered a parking structure whose location information is flagged on a map or otherwise in memory as a headlight operating location. Responsive to this determination, the headlights are activated to enhance the visibility of the vehicle to other vehicles in the parking structure.

In a case where location information for all parking structures is flagged or designated as a headlight operating location and/or tail light operating location, the system 10 may be configured to operate the pertinent lights whenever the vehicle is in a parking structure, because the vehicle is in a parking structure. Alternatively, the system 10 may be configured to operate the pertinent lights when the vehicle is in a particular parking structure because that particular parking structure is designated as a headlight operating location and/or tail light operating location, while other parking structures may not be so designated.

In another example, the system 10 determines from the vehicle location that the vehicle has entered a tunnel whose location information is saved on a map or otherwise in memory as a headlight operating location. Responsive to this determination, the headlights are activated to enhance the visibility of the vehicle to other vehicles in the tunnel.

In a case where location information for all tunnels is flagged or designated as a headlight operating location and/or tail light operating location, the system 10 may be configured to operate the pertinent lights whenever the vehicle is in a tunnel, because the vehicle is in a tunnel. Alternatively, the system 10 may be configured to operate the pertinent lights when the vehicle is in a particular tunnel because that particular tunnel is designated a headlight operating location and/or tail light operating location, while other tunnels may not be so designated.

Figure 7:
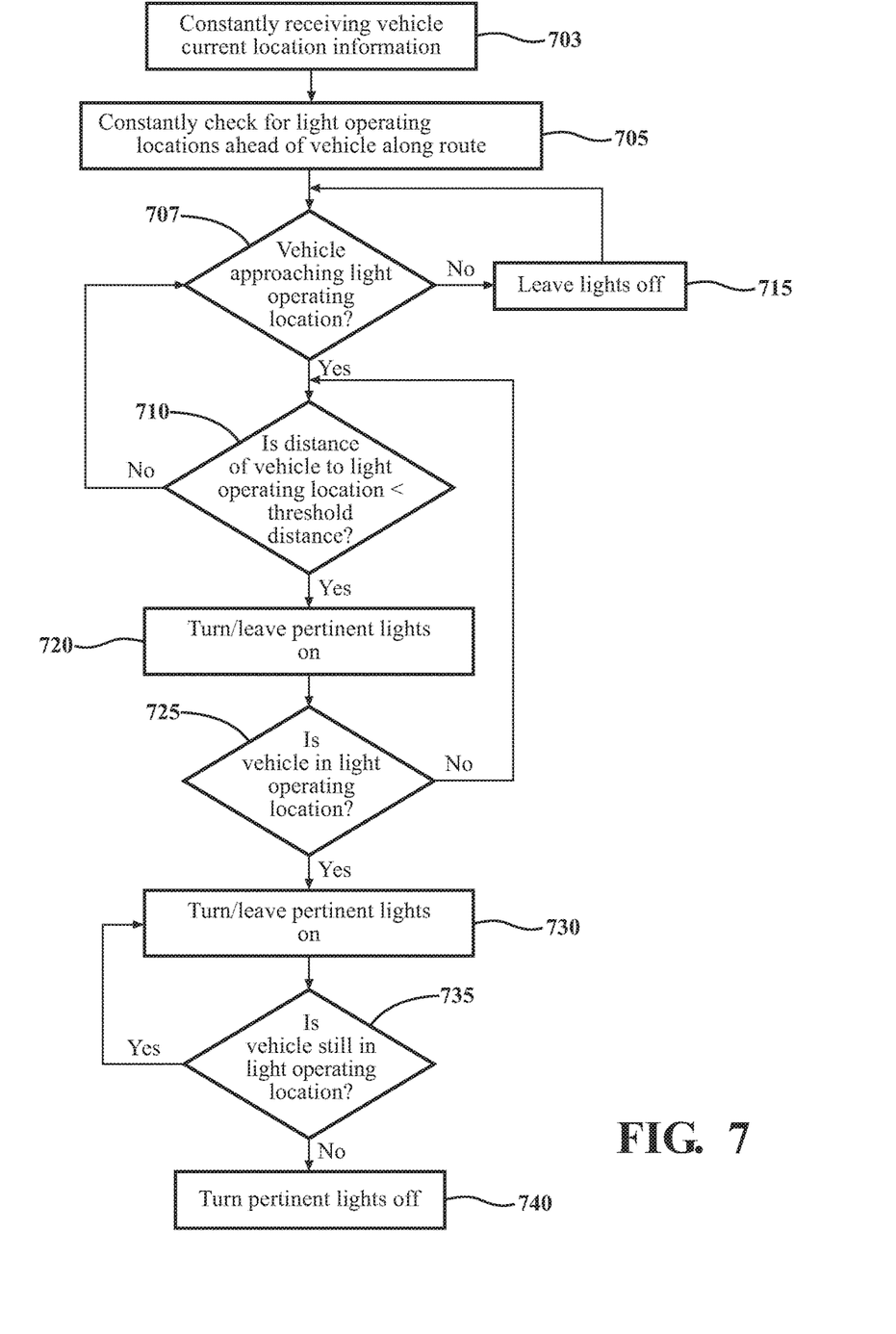
FIG. 7 is a flow diagram illustrating operation of an embodiment of an exterior light control system configured to activate vehicle exterior lights prior to reaching a light operating location, under certain conditions.

FIG. 7 is a flow diagram illustrating operation of an embodiment of the exterior light control system 10 configured to activate vehicle exterior lights prior to reaching a light operating location, under certain conditions. It is noted that embodiments of the system 10 may be configured to activate exterior lights prior to reaching certain light operating locations, and also configured to activate exterior lights only after reaching other light operating locations.

In block 703, the computing device 14 constantly receives updated vehicle current location information via the navigation system. In block 705, the computing device 14 constantly checks for light operating conditions along the vehicle current path. The path being traveled may be a route planned by the navigation system. Knowing the route in advance, the computing device may examine information for locations ahead of the vehicle for indications that any of these locations are light operating locations. The computing device may also compare coordinates ahead of the vehicle to known, stored light operating location information stored in memory.

In block 707, if the vehicle is determined not to be approaching a light operating location, control transfers to block 715, and the pertinent exterior lights are not operated. The system then continues to monitor ahead of the vehicle for light operating locations (in block 707). If the vehicle is determined to be approaching a light operating location, control transfers to block 710, where the computing device determines if the distance from the vehicle to the light operating location is at or below a certain predetermined threshold.

If the distance from the vehicle to the light operating location is not at or below the threshold, the computing device 14 redetermines (in block 707) whether the vehicle is still approaching the light operating location. If the distance from the vehicle to the light operating location is at or below the threshold, the computing device 14 (in block 720) turns on the pertinent exterior lights. The computing device then determines (in block 725) if the vehicle is at or within the light operating location. If the vehicle is not yet within the light operating location, the computing device redetermines whether the distance from the vehicle to the light operating location is at or below the threshold. This may indicate that the vehicle is still approaching, but has not yet reached the light operating location.

In block 730, if the vehicle is at or within the light operating location, the pertinent exterior lights are left on. The computing device then determines (in block 735) if the vehicle is still within the light operating location. If the vehicle is still within the light operating location, the vehicle lights are left on (block 730). If the vehicle is not still within the light operating location, the lights are turned off (block 740).

In another operational mode, the exterior light control system 10 is configured to automatically operate the vehicle headlights and/or tail lights responsive to the vehicle's approaching or reaching a known head/tail light operating location residing along a route planned by the navigation system. The known head/tail light operating location may be stored in a GPS map or in other navigational information.

In one example, the system 10 determines from the vehicle location that the vehicle is about to enter a tunnel whose location information is saved on a map or in otherwise memory as a headlight operating location. Responsive to this determination, the headlights are activated to enhance the visibility of the vehicle to other vehicles in the tunnel. When the vehicle the tunnel, the headlights may be automatically turned off.

When a known headlight operating location or tail light operating location is stored in the map data, the system 10 may, if desired, activate the pertinent vehicle lights prior to reaching the light operating location. For example, the headlights may be turned on prior to entering a tunnel having GPS map coordinates determined by the vehicle to designate a headlight operating location. This ensures that the headlights will be switched on for maximum visibility when the vehicle enters the headlight operating location.

The system 10 may be configured to activate any pertinent exterior lights prior to entry into any exterior light operating location if the vehicle is determined to be in a location within a predetermined distance from the exterior light operating location and is determined to be approaching the exterior light operating location (for example, when the distance between the vehicle and the exterior light operating location is constantly decreasing). This may be determined by comparing the current vehicle coordinates with the coordinates of the exterior light operating location.

Similarly, the system 10 may be configured to activate any pertinent exterior lights prior to entry into a exterior light operating location if the exterior light operating location lies along a planned route of the vehicle (for example, as determined by the GPS or navigation system). For example, the lights may be activated when the vehicle reaches a certain distance from the light operating location. Activation of the lights prior to reaching the exterior light operating location ensures that the lights will be switched on for maximum visibility if and when the vehicle enters the exterior light operating location, in spite of any variations in vehicle speed between the vehicle's current position and the exterior light operating location.

Figure 3A:
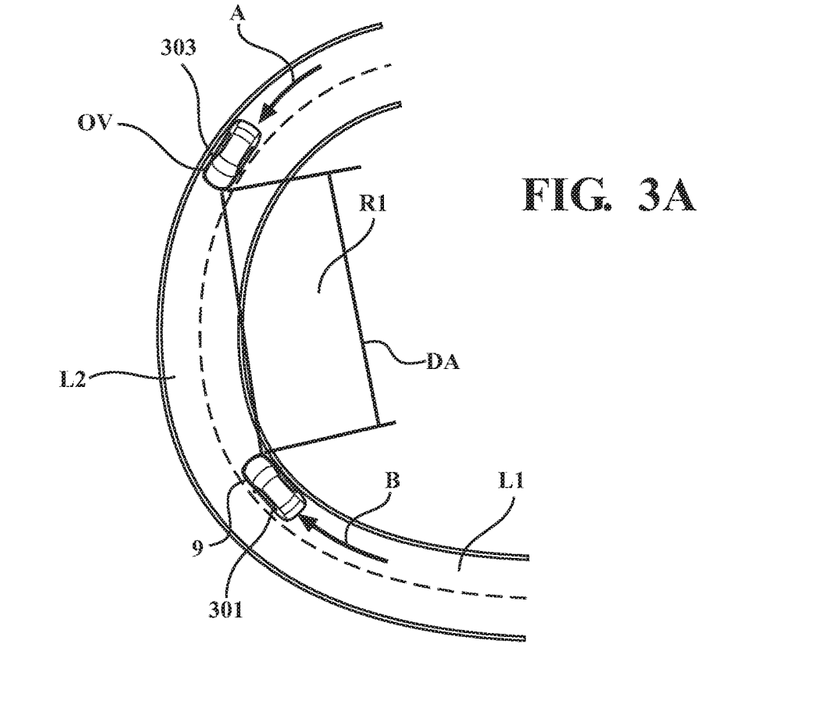
FIGS. 3A-3B are schematic views illustrating operation of one embodiment of a location-based exterior light control system in one example of a relatively lower-visibility radius terrain area.
Figure 3B:
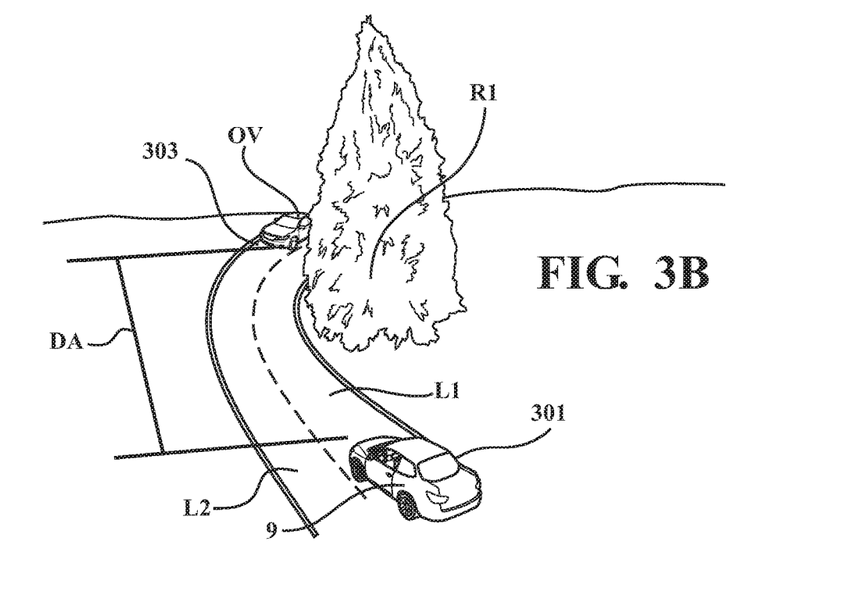
Figure 4:
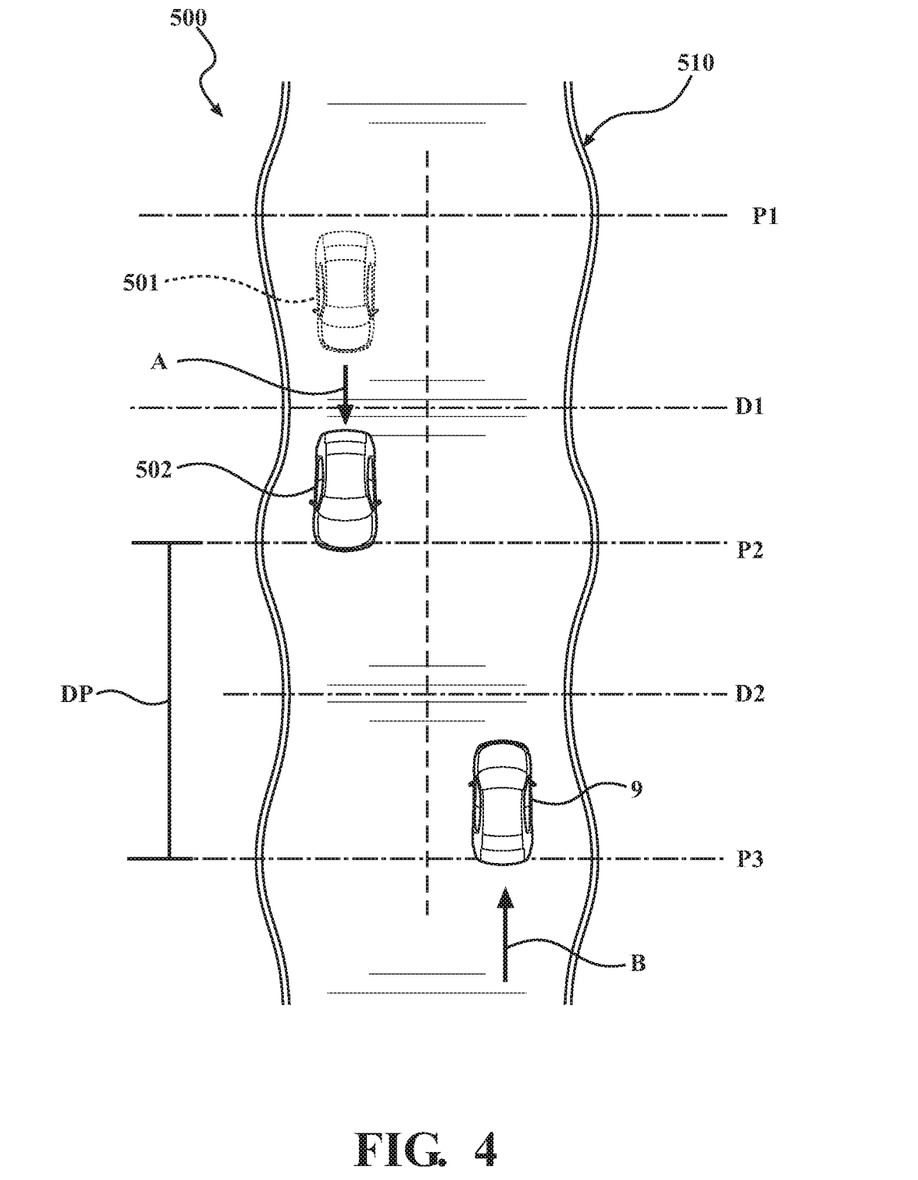
FIG. 4 is a schematic view illustrating operation of one embodiment of a location-based exterior light control system in another example of a relatively lower-visibility radius terrain area.

Referring to FIGS. 3A-3B and 4, in another aspect, the system 10 is configured to operate the headlights when the vehicle is in a relatively lower-visibility radius terrain area (i.e., in terrain where the visibility of oncoming traffic is limited to below a certain threshold distance, for example, 500 feet). This may increase the visibility of the vehicle to oncoming traffic in such areas, especially in high-speed environments where driver reaction time is further reduced. Location information relating to such lower visibility-radius terrain areas may be flagged on GPS maps or navigation systems as stretches of road. Alternatively, the location information may be saved in a memory for comparison to current vehicle coordinates, as previously described. Lower visibility-radius terrain areas may be identified, for example, by traversing such areas in a vehicle or by examining satellite photographs of areas deemed to be potential lower-visibility radius terrain areas.

The system 10 may be configured to detect the vehicle's movement toward the lower-visibility radius terrain area as an extension of the vehicle's current trajectory (i.e., the system assumes that the vehicle will reach the lower-visibility radius terrain area if it keeps following the route it is currently traveling). Alternatively, the system may detect the lower-visibility radius terrain area as a feature of a route planned by the navigation system and which is currently being followed by the vehicle.

Referring to FIG. 4, one example of a lower-visibility radius terrain area 500 is a section of a two-way road 510 located in a region of tightly-spaced undulating or rolling hills. FIG. 4 shows a series of successive peaks or hilltops P1, P2, P3 encountered by an oncoming vehicle OV as it proceeds in direction "A" along road 510 toward ego-vehicle 9 (traveling in opposite direction "B"). FIG. 4 shows vehicle OV at a position 501 at a time t1 and at position 502 at a time t2 later than t1. A dip or lower-lying portion of the road (such as dips D1, D2) resides between each pair of adjacent peaks.

Vehicle OV should be visible from ego-vehicle 9 when vehicle OV is at peak 1 and ego-vehicle 9 is at peak P2, because only dip D2 resides between the peaks. Depending on the heights of the peaks P1, P2, P3 relative to each other, vehicle OV may be visible from ego-vehicle 9 when vehicle OV is at peak P1 and ego-vehicle 9 is at peak P3. However, due to the rolling terrain, vehicle OV is not visible to ego-vehicle 9 when vehicle is at dip D1 and ego-vehicle 9 is at dip D2. Also, vehicle OV is not visible to ego-vehicle 9 when vehicle is at dip D1 and ego-vehicle 9 is at peak P3.

Vehicle OV should also be visible from ego-vehicle 9 when vehicle OV is at peak P2 and ego-vehicle 9 is at dip D2. A vehicle in any of dips D1, D2 should be visible from any peak adjacent the dip. However, the distance between any peak and an adjacent dip will not be as large as the distance between two adjacent peaks. In such terrain, and especially in instances where the vehicles 9 and OV are approaching each other at high speeds, it is desirable for the vehicles to see each other as soon as possible (i.e., when the vehicles are still as far apart as possible). Thus, the system 10 may be configured to automatically turn on the ego-vehicle headlights when the vehicle is detected to be in or approaching an area of rolling terrain where the distance DP between adjacent peaks is below a predetermined minimum threshold. This helps ensure enhanced visibility of the ego-vehicle as soon as possible during the time the ego-vehicle is traversing such terrain.

Referring to FIGS. 3A and 3B, another example of a relatively lower-visibility radius terrain area is a curved section of a two-way road extending around the base of a mountain or hill or a heavily-forested area R1, or any other curved-road area where visibility ahead is limited, especially along a portion of the road with a small curvature radius. When driving in such terrain, the relatively small distance DA between approaching vehicles OV and 9 when they come into sight of each other, and the corresponding reduction in available reaction time, make it desirable to maximize the visibility of the each vehicle to oncoming traffic, especially when the vehicle are approaching each other at high speeds.

In the embodiment shown, the control system 10 is configured to turn the headlights on along such curved stretches of road where the visibility distance DA is 500 feet or less. However, the control distance may set to any desired value, based on the perceived requirements of a particular application. This visibility distance may be measured between a given location (for example, location 301) in a first lane L1 closest to the terrain feature around which the road extends, and the visible location (for example, location 303) in an oncoming lane L2 adjacent the lane L1. This helps ensure increased visibility of the ego-vehicle along low-radius and low-visibility curved stretches of road. The range of measurement locations and distances can be determined from satellite photographs of areas deemed to be potential lower-visibility radius terrain areas, for example.

In one example, an area may be designated as a lower-visibility radius terrain area in GPS maps or in a navigational information database if, when driving in the area, oncoming vehicles become visible to each other at a distance below a predetermined threshold (for example, 500 feet). However, the threshold may be set to any desired value depending on the road curvature and other pertinent factors.

The system may be configured to activate the pertinent exterior lights prior to entry into the lower visibility radius terrain area if the vehicle is determined to be in a location within a predetermined distance from the lower-visibility radius terrain area and is determined to be approaching the lower visibility radius terrain area (for example, when the distance between the vehicle and the designated area is constantly decreasing). Similarly, the system 10 may be configured to activate the pertinent lights prior to entry into the lower visibility radius terrain area if the lower visibility radius terrain area lies along a planned route of the vehicle (for example, as determined by the GPS or navigation system). This ensures that the lights will be switched on for maximum visibility if and when the vehicle enters the lower-visibility radius terrain area, in spite of any variations in vehicle speed between the vehicle's current position and the lower-visibility radius terrain area. In addition, operation of the tail lights in conjunction with the headlights in such terrain increases the visibility of the ego-vehicle to other vehicles driving behind the ego-vehicle.

Figure 6:
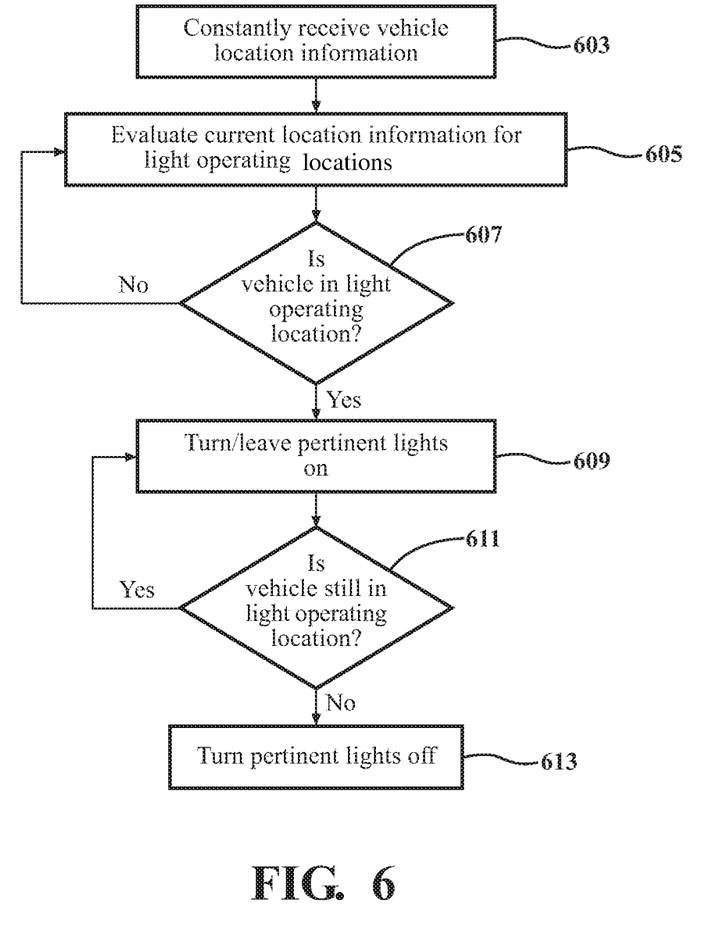
FIG. 6 is a flow diagram illustrating operation of an embodiment of the exterior light control system configured to activate vehicle exterior lights upon reaching a light operating location.

FIG. 6 is a flow diagram illustrating operation of an embodiment of the exterior light control system 10 configured to activate vehicle exterior lights upon reaching a light operating location. It is noted that embodiments of the system 10 may be configured to activate exterior lights prior to reaching certain light operating locations, and also configured to activate exterior lights only after reaching other light operating locations. Thus, for example, the system 10 may be configured to activate the headlights when at or inside a parking structure, while the same system is configured to activate the headlights prior to reaching a relatively lower-visibility radius terrain area such as a section of curved road as described herein.

In block 603, the computing device 14 constantly receives updated vehicle current location information via the navigation system.

In block 605, the computing device 14 constantly evaluates the received current location information for light operating locations. As described elsewhere herein, indications of a light operating location may be embedded or included in navigational information, or the location information for the light operating location may be stored in a memory.

In block 607, if the vehicle is determined not to be in a light operating location, control transfers to block 605, where the computing device continues to evaluate the current position of the vehicle. If the vehicle is determined to be in a light operating location, control transfers to block 609, where the computing device turns on the pertinent exterior lights. The computing device then determines (in block 611) if the vehicle is still within the light operating location. If the vehicle is still within the light operating location, the vehicle lights are left on (block 609). If the vehicle is not still within the light operating location, the lights are turned off (block 613).

In addition, the system 10 may be configured to operate the vehicle hazard lights based on the location of the vehicle. When it is determined by the computing device that the current vehicle coordinates place the vehicle in a hazard light operating location, the computing device automatically activates the hazard lights. When the vehicle is no longer in the hazard light operating location, the hazard lights may be automatically turned off.

In one example, the vehicle is configured to detect (by use of a known position-detection means 101, such as a lane-keeping system, camera or lidar system, for example) when the vehicle leaves a driving lane and moves onto a side of the road. The system 10 may automatically activate the hazard lights when the system detects exiting of the vehicle past the lane boundary onto the roadside. This is useful if the driver pulls over to the side of the road but forgets to activate the hazard lights.

In another example, if the vehicle is far enough off-road so that (or the navigation system resolution is sufficient such that) the vehicle's off-road position is determinable using GPS or other navigation system coordinates, the hazard lights may be activated responsive to detection of the off-road condition using the navigation system.

In another particular embodiment, the system 10 is configurable by a user to remind the user to manually turn the head/tail lights and/or hazard lights on and off according to the various criteria set forth above. Reminders to the user may be provided prior to automated operation of the lights as previously described. In this embodiment, if the user does not operate the lights when prompted, the lights are operated as previously described within a predetermined time after the reminder is provided. Alternatively, the reminders may be provided in place of automated operation of the lights. In this case, there is no automated operation of the lights. The system 10 may be configured so that the preferred option(s) are selectable using the user interface 109.

Figure 5:
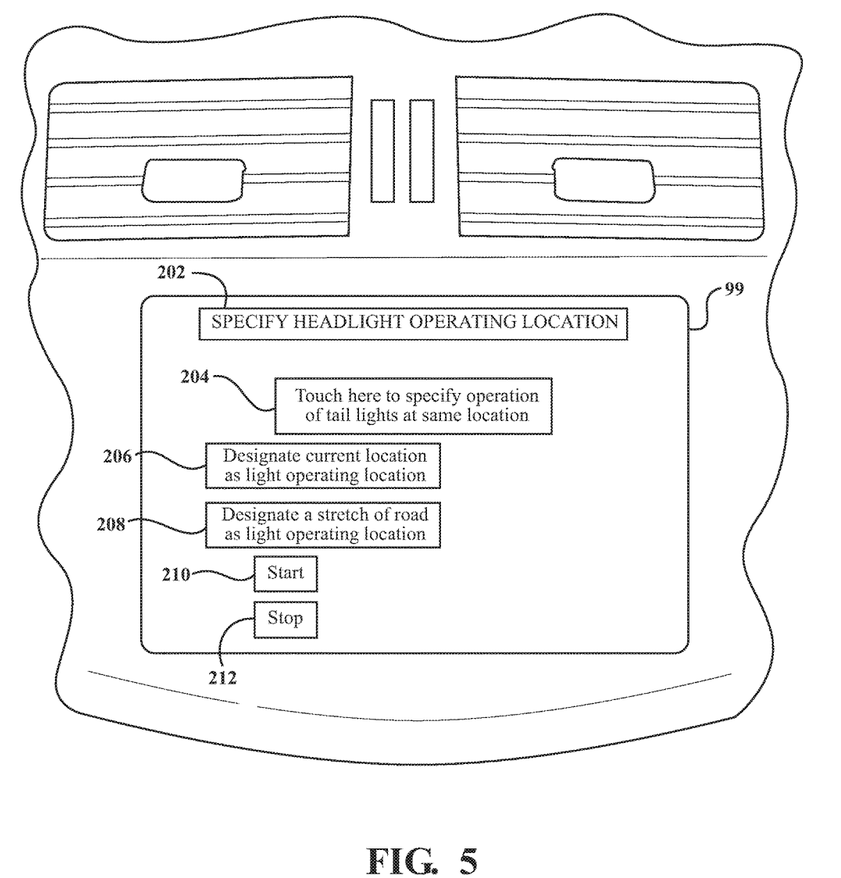
FIG. 5 shows one embodiment of an interactive touch-screen incorporated into interface and configured for eliciting user designation of specified areas and locations as light operating locations.

In a particular embodiment, a user may designate an area or portion of road as a "light operating location" if the area is not designated as such on current maps or navigational information. FIG. 5 shows one embodiment of an interactive touch-screen 99 incorporated into interface 109 and configured for eliciting user designation of specified areas and locations as light operating locations. In the embodiment shown, the touch-screen 99 offers the user the option of designating certain locations or areas as "headlight operating locations". However, it will be understood that separate menu options (not shown) enabling selection of locations as "tail light operating locations", "hazard operating locations" and operating locations for other exterior lights may be provided in addition to the options shown in FIG. 5.

In field 204, the user may elect to designate the same location that is to be designated a "headlight operating location", as a "tail light operating location". If this field is not touched by the user, the location determined by the user will only be designated a "headlight operating location". The user may then elect to either designate a current location of the vehicle as a "headlight operating location" (by touching field 206) or a stretch of road as a "headlight operating location" (field 208).

In one particular embodiment, if the user elects to designate a current location of the vehicle as a "headlight operating location", the system 10 is configured to flag the current vehicle coordinates and also all coordinates (if any) saved in the navigational information as relating to a particular discrete structure, as part of a "headlight operating location". For example, if a set of GPS coordinates are all located inside a parking structure and the current vehicle coordinates fall within the set of coordinates located in the parking structure, the system 10 will flag all the parking structure coordinates as being in a "headlight operating location". Thus, anywhere the user drives within the parking structure will be considered a "headlight operating location", and the vehicle headlights will be switched on while driving inside the structure.

In another particular option (field 208), the system is configured to flag or designate a selected stretch of road as a "headlight operating location". After the user touches the "designate a stretch of road" portion of the screen, the user is prompted to touch the "start" portion 210 of the screen at a point on the road where the designated "headlight operating" stretch of road is to begin. The user is then prompted to touch the "stop" portion (field 212) of the screen at a point on the road where the designated stretch of road is to end. Instructions regarding when to touch the "start" and "stop" portions of the screen may be provided to the user after touching the "stretch of road" field. After touching "start", the system 10 flags and saves all the GPS coordinates or navigational information relating to the portion of road traveled between the "start" location and the "stop" location. This stretch of road is then designated a "headlight operating location". The vehicle lights may then be automatically be operated whenever the vehicle resides within the designated location or stretch of road, unless such automatic operation is modified by the user as described elsewhere herein.

Light operating locations selected by a user may also be erased or deleted from the system at any time. In one embodiment, for example, whenever a user-defined "light operating location" is implemented, a notification may be displayed on the touch-screen that the user-defined "light operating location" is being implemented. The user may then be prompted to indicate whether or not they wish to retain the noted user-defined "light operating location". The user may be given the option to retain or delete the user-defined "light operating location". In addition, any user-defined "light operating location" may also be overridden by exercising manual control over any of the vehicle exterior lights. Manual operation of the vehicle lights will automatically discontinue automated operation of the lights and return control of the lights to the user.

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computing device for a vehicle exterior light control system, the computing device comprising one or more processors for controlling operation of the computing device, and a memory for storing data and program instructions usable by the one or more processors, wherein the one or more processors are configured to execute instructions stored in the memory to automatically operate vehicle headlights responsive to a location of the vehicle in or approaching an area of undulating or rolling terrain where a distance between adjacent peaks is below a predetermined minimum threshold.

2. The computing device of claim 1 wherein the relatively lower-visibility radius terrain area is a curved section of a two-way road extending around a forested area.

3. A computing device for a vehicle exterior light control system, the computing device comprising one or more processors for controlling operation of the computing device, and a memory for storing data and program instructions usable by the one or more processors, wherein the one or more processors are configured to execute instructions stored in the memory to automatically operate vehicle headlights responsive to a location of the vehicle in a location including a curved section of a two-way road extending around a base of a mountain or hill.

4. A computing device for a vehicle exterior light control system, the computing device comprising one or more processors for controlling operation of the computing device, and a memory for storing data and program instructions usable by the one or more processors, wherein the one or more processors are configured to execute instructions stored in the memory to:
    enable a user to designate a location as a relatively lower-visibility radius terrain area, and
    automatically operate vehicle headlights responsive to a presence of the vehicle in the location.

5. A vehicle including a computing device in accordance with claim 1.

6. A computing device configured for controlling exterior lights on a vehicle, the computing device comprising one or more processors for controlling operation of the computing device, and a memory for storing data and program instructions usable by the one or more processors, wherein the one or more processors are configured to execute instructions stored in the memory to enable a user to designate a location as a "light operating location" in which one or more exterior vehicle lights are automatically operated responsive to a presence of the vehicle in the light operating location.

7. The computing device of claim 6 wherein the one or more processors are configured to execute instructions stored in the memory to enable the user to delete a previously designated "light operating location".

8. A computing device configured for controlling exterior lights on a vehicle, the computing device comprising one or more processors for controlling operation of the computing device, and a memory for storing data and program instructions usable by the one or more processors, wherein the one or more processors are configured to execute instructions stored in the memory to enable the user to designate a set of coordinates which are all located inside a parking structure as a "light operating location" in which one or more exterior vehicle lights are automatically operated responsive to a presence of the vehicle in the light operating location.

9. A method of controlling vehicle exterior lights comprising the steps of:
    receiving a user-designation of a location as a "light operating location" in which one or more exterior vehicle lights are automatically operated responsive to a presence of the vehicle in the light operating location; and
    automatically operating one or more exterior vehicle lights responsive to a presence of the vehicle in the user-designated light operating location.

10. The computing device of claim 6 wherein the one or more processors are configured to execute instructions stored in the memory to enable the user to designate a selected stretch of road as a "headlight operating location".

11. The computing device of claim 6 wherein the one or more processors are configured to execute instructions stored in the memory to enable the user to designate a location as a "hazard light operating location".

12. A vehicle including a computing device in accordance with claim 6.

* * * * *